Patented June 25, 1929.

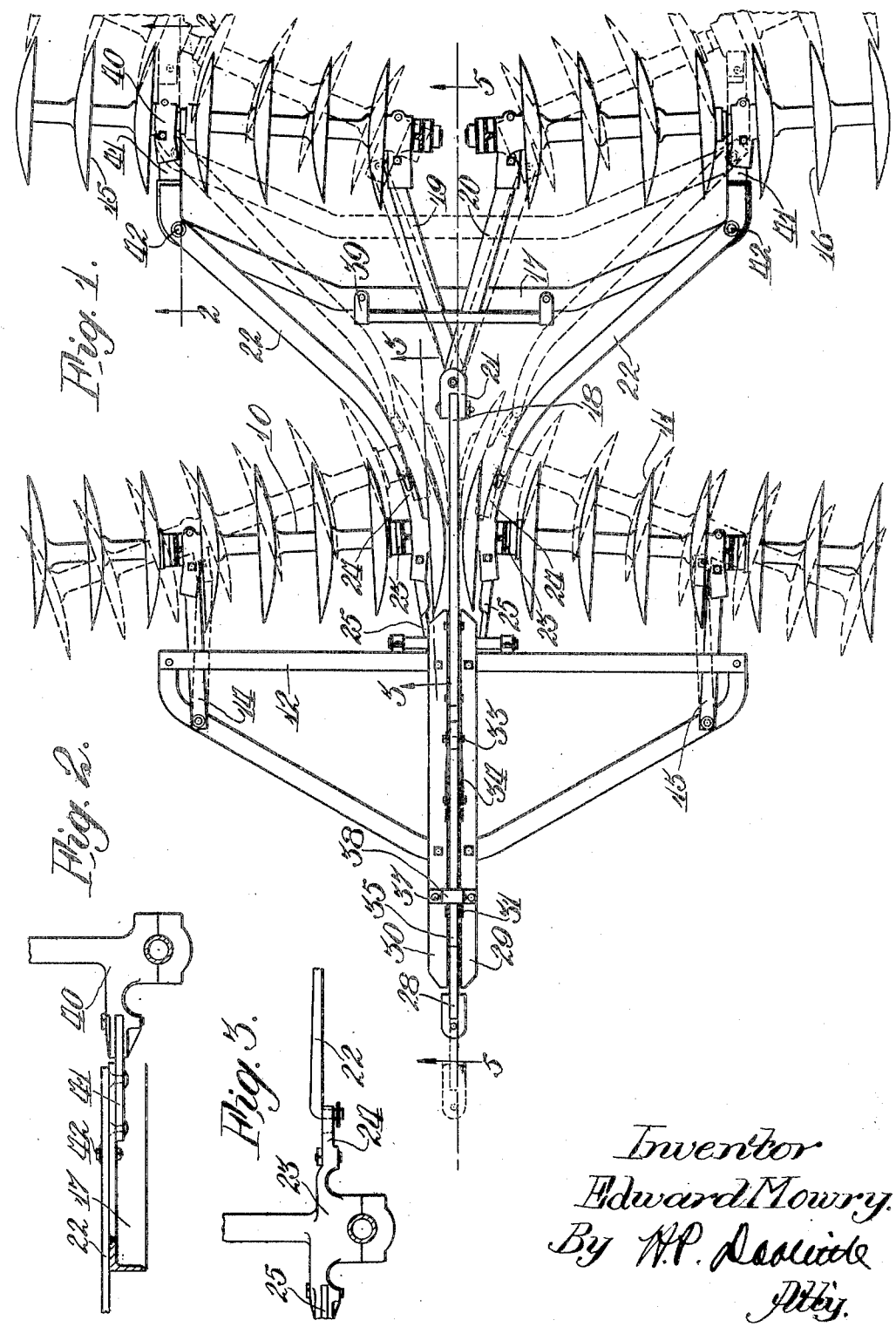

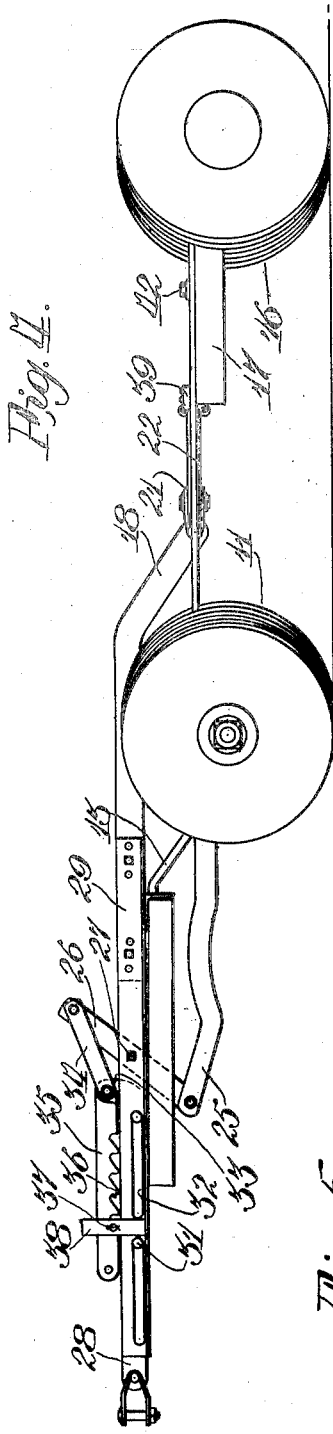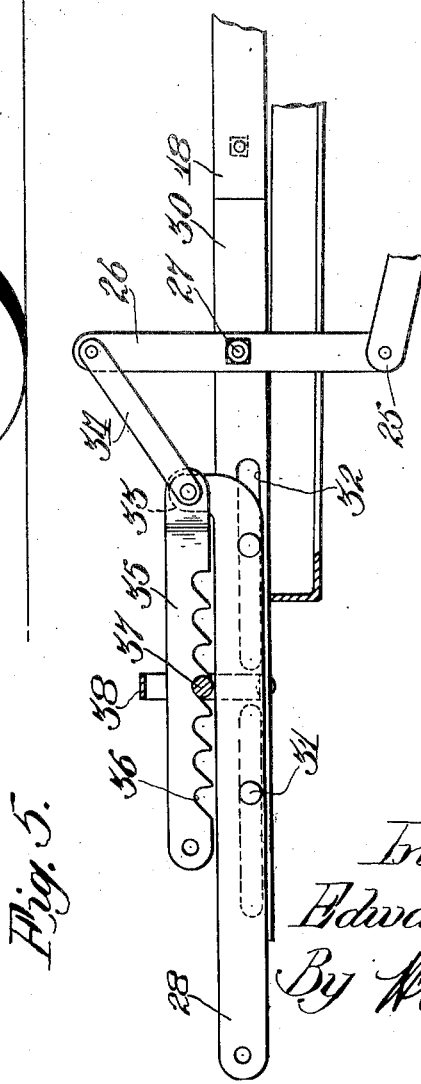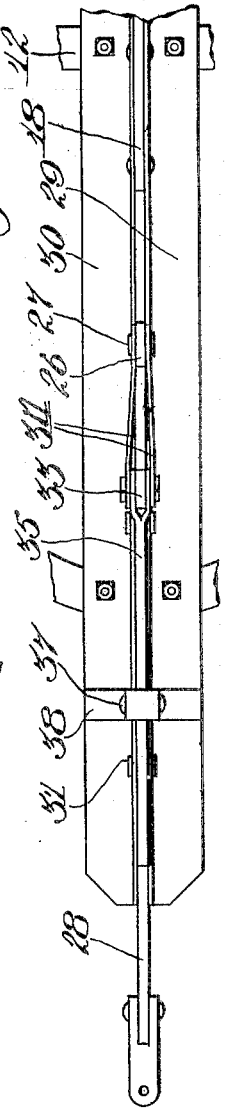

1,718,796

UNITED STATES PATENT OFFICE

EDWARD MOWRY, OF ROCK FALLS, ILLINOIS, ASSIGNOR TO INTERNATIONAL HARVESTER COMPANY, A CORPORATION OF NEW JERSEY.

TRACTOR DISK HARROW.

Application filed January 11, 1928. Serial No. 245,827.

This invention presents improvements in tandem disk harrows.

An object of the invention is to provide a tandem disk harrow having novel mechanism for controlling the angling and straightening of the disk gangs.

A more specific object of the invention is to provide a tandem disk harrow having draft control devices for moving the outer ends of the rear gangs and the inner ends of the front gangs to straighten or angle these gangs.

Other objects of the invention will appear as the following description proceeds.

An illustrative embodiment of the invention is shown in the accompanying drawings, in which:

Figure 1 is a plan view of the harrow;

Figure 2 is a detail view on the vertical plane indicated by the section line 2—2 of Figure 1;

Figure 3 is a detail view illustrating the connection between the inner end of a forward gang and the device for moving that gang, taken in a vertical plane on the section line 3—3 of Figure 1;

Figure 4 is substantially a side elevation of the harrow shown in Figure 1;

Figure 5 is an enlarged detail view taken largely along a vertical plane indicated by the section line 5—5 of Figure 1; and Figure 6 is a plan view of the parts shown in Figure 5.

The drawings show front gangs 10 and 11 pivotally attached near their outer ends to the outer ends of the front frame 12 by means of links 13 and 14. The rear harrow gangs 15 and 16 are pivotally attached near their outer ends to a rear frame 17. The inner ends of the rear gangs are pivotally connected to a coupling bar or support 18 which is rigid with the front frame 12. Extending between the support 18 and the inner ends of the rear gangs are the rearwardly divergent links 19 and 20. As indicated in the drawings, these links are pivotally secured to the inner ends of the rear gangs by upright axes. Their connection to the support 18 is by means of a clevis 21 pivoted to the support by a horizontal axis and to the links by a vertical axis, as clearly shown in the drawings.

Figure 1 shows exterior connections 22 pivoted at the outer ends of the rear frame 17. These connections converge forwardly to positions where they are pivotally connected with the front gangs, as particularly illustrated in Figure 3 of the drawings. The numeral 23 indicates a bearing bracket of one of the front gangs. This bearing bracket has an extension 24, through which a downturned end of the connection 22 extends.

Extending forwardly from the inner ends of the front gangs are links 25 which pivotally unite the bearing brackets 23 with the lower end of an equalizer 26, particularly shown in Figures 4 and 5 of the drawings. This equalizer is pivoted in upright position on the front frame 12 by a horizontal pivot indicated at 27. The upper end of the equalizer 27 is pivotally connected to a draft bar 28 slidable between two angle bars 29 and 30 fixed to the front frame. The draft bar 28 is guided during its forward and rearward movements by a pin and slot connection with the bars 29 and 30. Such connections are indicated by the numerals 31 and 32 in Figure 5 of the drawings.

The rearward end of the draft bar 28 has an upturned end 33, to which is pivotally connected a link 34 and a latch bar 35 having ratchet teeth 36 engageable with a fixed stop 37, to prevent forward movement of the bar 28 relative to the front frame 12 while the latch bar is in engagement with that stop. The stop is carried by an upright 38 fixed to the front frame.

From an inspection of Figures 1 and 5 of the drawings, it will be seen that a backward thrust by the bar 28 transmits a forward pull to the links 25, and thus to the inner ends of the front gangs. This will move the gangs from their dotted line positions to their full line positions shown in Figure 1. By reason of the connections 22 between the rear frame and the inner ends of the front gangs, the rear gangs will be simultaneously pivoted about their inner ends and moved from their dotted line positions to their full line positions in Figure 1. Thus, the gangs of the harrow are straightened by a backward thrust of the draft bar 28.

Action the reverse of that just described moves the gangs to their working or dotted line positions. This reverse action necessitates the moving of the draft bar 28 in a forward direction relative to the front frame 12. This action is permitted by lifting the latch bar 35 out of contact with the stop 37. The extent to which the gangs are angled is determined by the particular one of the notches which receives the stop 37.

As shown in the drawings, the links 19 and 20 pass over the top of the rear frame 17. They are guided in their movement relative to the frame 17 by a member 39, which is secured in a position parallel to and spaced from the mid-portion of the frame 17.

Figure 2 shows the manner in which the rear gangs are connected to the frame 17. The numeral 40 indicates a bearing bracket of one of the rear gangs. This bearing bracket is pivotally connected to a plate 41 which is preferably rigid with the frame 17, as indicated. The connection 22 is pivoted to the frame 17 at 42.

Although the invention has been described with reference to a particular structure, it is to be understood that it is not limited thereto, but that it is of a scope commensurate with the scope of the subjoined claims.

What is claimed as new is:

1. A tandem disk harrow comprising, in combination, a front frame, front gangs pivotally connected to the front frame, rear gangs, coupling means between the gangs comprising a central bar rigidly connected to the front frame and extending rearwardly thereof and links pivotally connected to the rear end of said bar and to the inner ends of the rear gangs, a yoke supported by the links and pivotally connected to the rear gangs near their outer ends and bodily movable in fore and aft directions with those portions of the rear gangs, connections between the outer ends of said yoke and the inner ends of the front gangs, and draft actuated gang adjusting means pivotally connected to the inner ends of the front gangs and movable fore and aft relative to the front frame.

2. A tandem disk harrow comprising, in combination, a front frame including a pair of central angle bars forming a draft tongue, front gangs pivotally connected near their outer ends to the front frame, a rear frame, rear gangs pivotally connected near their outer ends to the rear frame, a bar secured at its forward end between the draft tongue members and extending rearwardly and downwardly to a point at the rear of the front gangs, a clevis member pivoted on a horizontal axis to the rear end of said bar, a pair of links connected to the inner ends of the rear gangs and pivoted on a vertical axis to the clevis member, forwardly converging reach bars pivotally connecting the inner ends of the front gangs with the rear frame, and gang angling mechanism mounted on the tongue members and connected to the inner ends of the front gangs.

In testimony whereof I affix my signature.

EDWARD MOWRY.